United States Patent [19]

Pool et al.

[11] E Re. 30,787

[45] Reissued Nov. 3, 1981

[54] HAND HELD MASKING MACHINE

[76] Inventors: Danny L. Pool, 2025 E. Jackson, Phoenix, Ariz. 85034; Robert R. Pool, 607 E. Franklin, Mesa, Ariz. 85204

[21] Appl. No.: 53,113

[22] Filed: Jun. 27, 1979

Related U.S. Patent Documents

Reissue of:

[64] Patent No.: 4,096,021
Issued: Jun. 20, 1978
Appl. No.: 778,704
Filed: Mar. 17, 1977

[51] Int. Cl.[3] ..... B32B 31/08

[52] U.S. Cl. ..... 156/527; 156/554; 156/577; 156/579

[58] Field of Search ..... 156/527, 554, 577, 579, 156/523, 574, 526, 544

[56] References Cited

U.S. PATENT DOCUMENTS

| | | | |
|---|---|---|---|
| Re. 23,542 | 9/1952 | Bihary | 156/554 |
| 1,797,854 | 3/1931 | Carter | 156/523 |
| 1,963,666 | 6/1934 | McCarthy et al. | 156/577 |
| 2,366,675 | 1/1945 | Petty | 156/577 |
| 2,374,103 | 4/1945 | Johnson | 156/554 |
| 2,522,773 | 9/1950 | Bihary | 156/554 |
| 2,636,691 | 4/1953 | Fritzinger | 156/577 |
| 2,916,078 | 12/1959 | Hebert, Jr. | 156/554 |
| 3,120,461 | 2/1964 | Harbour | 156/554 |
| 3,152,032 | 10/1964 | Waltz | 156/554 |
| 3,263,883 | 8/1966 | Waltz | 225/36 |
| 3,318,753 | 5/1967 | Whitlow | 156/461 |
| 3,325,336 | 6/1967 | Gibson | 156/577 |
| 3,390,041 | 6/1968 | Auld et al. | 156/577 |
| 3,404,058 | 10/1968 | Fink, Jr. | 156/527 |
| 3,463,694 | 8/1969 | Roshia | 156/523 |
| 3,547,740 | 12/1970 | Hinds | 156/523 |
| 3,553,060 | 1/1971 | Waltz | 156/515 |
| 3,567,557 | 3/1971 | Kingery et al. | 156/523 |
| 3,600,255 | 8/1971 | Hinds | 156/527 |
| 3,658,628 | 4/1972 | Zenter | 156/523 |
| 3,666,601 | 5/1972 | Wuerch | 156/527 |
| 3,787,271 | 1/1974 | Wahlquist | 156/554 |
| 3,813,274 | 5/1974 | Rothenberger | 156/527 |
| 3,847,709 | 11/1974 | Martin | 156/554 |
| 3,950,214 | 4/1976 | Pool et al. | 156/527 |
| 3,968,001 | 7/1976 | Lockwood | 156/523 |
| 4,054,482 | 10/1977 | Wahlquist | 156/523 |

FOREIGN PATENT DOCUMENTS 533505 2/1941 United Kingdom .

*Primary Examiner*—Michael G. Wityshyn
*Attorney, Agent, or Firm*—Don J. Flickinger

[57] ABSTRACT

The disclosure relates to a hand held masking machine which is used for masking various surfaces adjacent to which paint is to be applied, as for example the machine may be used on a wall adjacent a ceiling so that the ceiling may be painted without contacting the adjacent wall with a brush or overlapping with spray paint. The hand held masking machine in accordance with the present disclosure is provided with a frame having offset portions holding a tape roll holder and a paper roll holder with their ends offset so that the tape is dispensed in such a manner that part of the tape adheres to the paper on the roller and the rest of the tape overlaps the paper beyond the edge of the paper roll and beyond the edge of the paper dispensed therefrom. The paper and tape is dispensed in adhered relation to each other and the tape is then adhesively engaged with a surface to which it is applied and, following this, the machine is moved with the tape and the paper in tension which pulls the paper and tape from the machine in adhesively connected relationship and a guide bar on the forward portion of the frame wipes the adhesive tape securely into adhesive relation with the surface being applied as the machine is moved along said surface.

7 Claims, 9 Drawing Figures

HAND HELD MASKING MACHINE

Matter enclosed in heavy brackets [ ] appears in the original patent but forms no part of this reissue specification; matter printed in italics indicates the additions made by reissue.

BACKGROUND OF THE INVENTION

The prior art contains hand held masking machines which apply adhesive tape and paper to a surface being masked, and these machines employ an applicator roller which frictionally dispenses the tape and paper from the machine as the said roller presses the paper onto the surface to be masked. Accordingly, prior art machines are substantially more complicated than required for efficient masking operations and such machines require the application of a substantial amount of manual force in the operation thereof. Additionally, prior art machines have been relatively bulky and heavy and have also required pressure rollers for pressing the adhesive tape securely into contact with the masking paper as it is dispensed from a roll on the machine. Additionally, various prior art machines have required complicated procedures to thread the paper and the tape through the machine, such as to be in a position for application of the tape and paper to form a mask adjacent to an area to be painted.

SUMMARY OF THE INVENTION

The present invention is provided with a unitary frame which supports a tape roll holder and a paper roll holder; an end portion of the tape roll holder being in overlapped relationship with an end of the paper roll holder such that tape dispensed from a roll of tape on the tape roll holder will overlap and extend beyond the edge of the paper dispensed from the paper roll holder. The tape roll holder is disposed such that adhesive tension of the tape being pulled from the periphery of the roll of tape causes the tape to be dispensed in adhesive pressure relationship over the periphery of the roll of paper on the paper roll holder as the paper and tape then passes from the area of the paper roll holder under a guide bar which is used for wiping and pressing the adhesive tape carrying the paper onto a surface being masked. The machine is provided with a unitary frame having forward and rearward portions and a manually engageable handle is provided with a longitudinal axis which is disposed at substantially right angles to the axes of the tape roll holder and the paper roll holder of the machine and spaced therefrom such that the longitudinal axis of the handle is disposed substantially at right angles to the axis of the paper roll holder and intersects the paper roll holder or the roll or paper between its opposite ends; the handle being provided with a free end which extends toward the rearward portion of the frame and the paper guide bar of the machine is mounted on the forward portions and substantially coextensive with the length of the roll of paper on the paper roll holder.

The longitudinal axis of the elongated handle is disposed preferably at right angles to the rotary axis of the paper roll holder and to the longitudinal axis of the guide bar, and is so disposed so that the handle may exert pressure generally in a median area with relation to opposite ends of the roll of paper so as to provide a stable operation of the machine as paper and tape are dispensed therefrom and during a time when the tape is being adhesively wiped onto a surface by means of the guide bar of the machine.

The machine is provided with a tensioning device which is resiliently loaded against the periphery of the roll of paper and insures even dispensation thereof in cooperation with the dispensation of tape from the roll of tape on the tape roll holder of the machine.

The guide bar is provided with a cutting edge directed forwardly relative to the forward portion of the frame of the machine, and the cutting edge is preferably a generally saw tooth shaped serrated edge adapted readily to cut or tear tape and paper at the forward edge of the guide bar after a desired area of a surface to be masked has been traversed and onto which paper and tape has been applied.

The guide bar is adjustably moveable longitudinally relative to the frame and fixable in various positions such that it extends varying distances beyond the end of the roll of paper at which the tape is applied. Whereby, tape of varying widths may be adhesively applied to the edge of the paper dispensed from the roll of paper and whereby the guide bar is coextensive to the extending edge of the tape even though it may be of various widths as desired for adhering to various surfaces for holding the paper adjacent thereto.

Accordingly, it is an object of the invention to provide a hand held masking machine which is of light weight and which is very compact and easy to operate.

Another object of the invention is to provide a hand held masking machine which readily dispenses paper and tape adhesively secured together without the need of pressure rollers for pressing the tape onto the paper and for pressing the paper and tape onto a surface being masked.

Another object of the invention is to provide a hand held masking machine which is very simple to load with paper and tape and which does not require complicated operations to thread the paper and tape through the machine is position for application of the paper and tape to a surface being masked.

Another object of the invention is to provide a hand held masking machine which is very rapid in use and which is therefore capable of masking large areas with a minimum of manual labor time.

Another object of the invention is to provide a hand held masking machine which is readily and easily loaded with paper and tape and which dispenses paper and tape adhesively secured together in such a manner that the tape, when adhesively engaged with a surface to be masked, will provide sufficient holding of the tape and paper on said surface such that tension applied to the paper and tape will unroll and dispense further tape and paper from the masking machine of the invention as the frame of the machine is drawn away from the area to which the tape is initially adhesively secured.

Further objects and advantages of the invention may be apparent from the following specification, appended claims and accompanying drawings.

DESCRIPTION OF THE PREFERRED EMBODIMENTS

Figure 2:
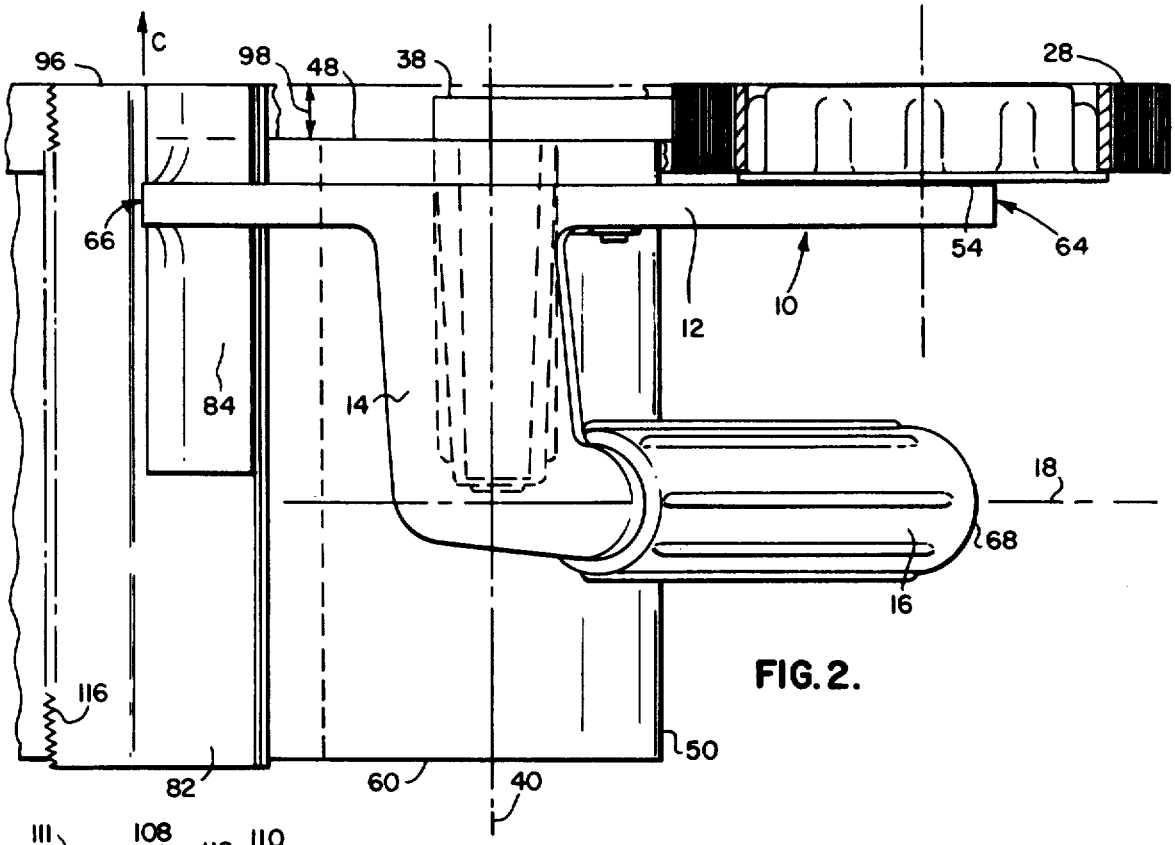
FIG. 2 is a view taken from the line 2—2 of FIG. 1.

The hand held masking machine of the invention, as shown in FIGS. 1-4 inclusive, is provided with a frame 10 having a substantially flat frame section 12, shown best in FIG. 2 of the drawings. Integral with this section 12 is an offset *handle* bracket portion 14 carrying a handle 16 which is an elongated handle having a longitudinal axis 18 which is substantially parallel to the flat portion 12 of the frame 10.

Figure 5:
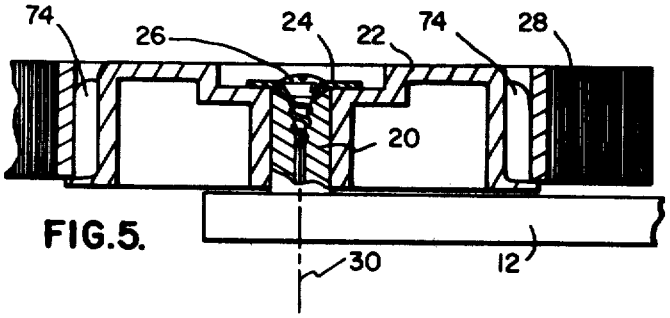
FIG. 5 is an enlarged sectional view taken from the line 5—5 of FIG. 1 showing portions of the machine fragmentarily.

Carried on the flat portion 12 of the frame 10, as shown best in FIG. 5, is an integral spindle 20 on which is rotatably mounted a generally circular tape roll holder 22. This roll holder 22 is retained on the spindle 20 by means of a washer 24 and a screw 26 which is threaded into the spindle 20.

Shown mounted on the tape roll holder in FIG. 5 is a roll of tape 28. This roll of *masking* tape 28 is shown in section. The spindle 20 [provides a rotary axis support for] *has an axis of rotation 30 about which* the tape roll holder 22 [and this] *also rotates. This* axis is designated 30 in FIG. 5 of the drawings and is concentric with the screw 26. Thus, [the rotary] axis 30 of the tape roll holder 22 is at substantially right angles to the flat frame portion 12 of the machine.

Figure 6:
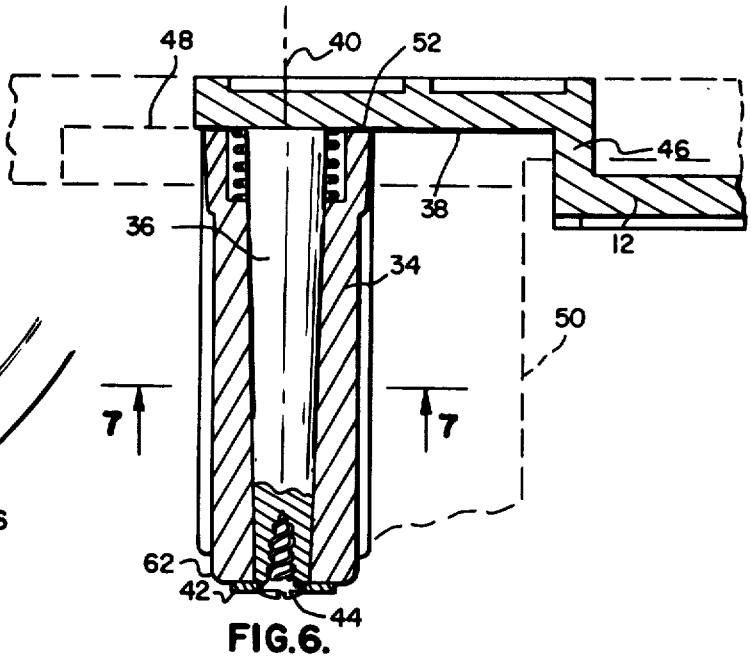
FIG. 6 is an enlarged fragmentary sectional view taken from the line 6—6 of FIG. 4.

As shown in FIG. 6 of the drawings, a paper roll holder 34 is rotatably mounted on a spindle 36 which is connected to or integral with an offset portion 38 of the frame 10; the spindle 36 being provided with a longitudinal axis 40 which constitutes the [rotary axis] *axis of rotation* of the paper roll holder 34 and this paper roll holder 34 is a hollow cylindrical member rotatably mounted on the spindle 36 and retained thereon by a washer 42 and a screw 44, which is threaded into the end of the spindle 36.

The offset portion 38 of the frame 10 is provided with an integral *connecting* portion 46 and this portion 46 is integral with the hereinbefore described flat portion 12 of the frame such as to provide an offset relationship [of] *between* the roll of tape 28 and an end portion 48 of a roll of paper *50* which is carried on the paper roll holder 36. This roll of paper is designated 50 in the drawings, and is a roll of expendable masking paper.

Figure 4:
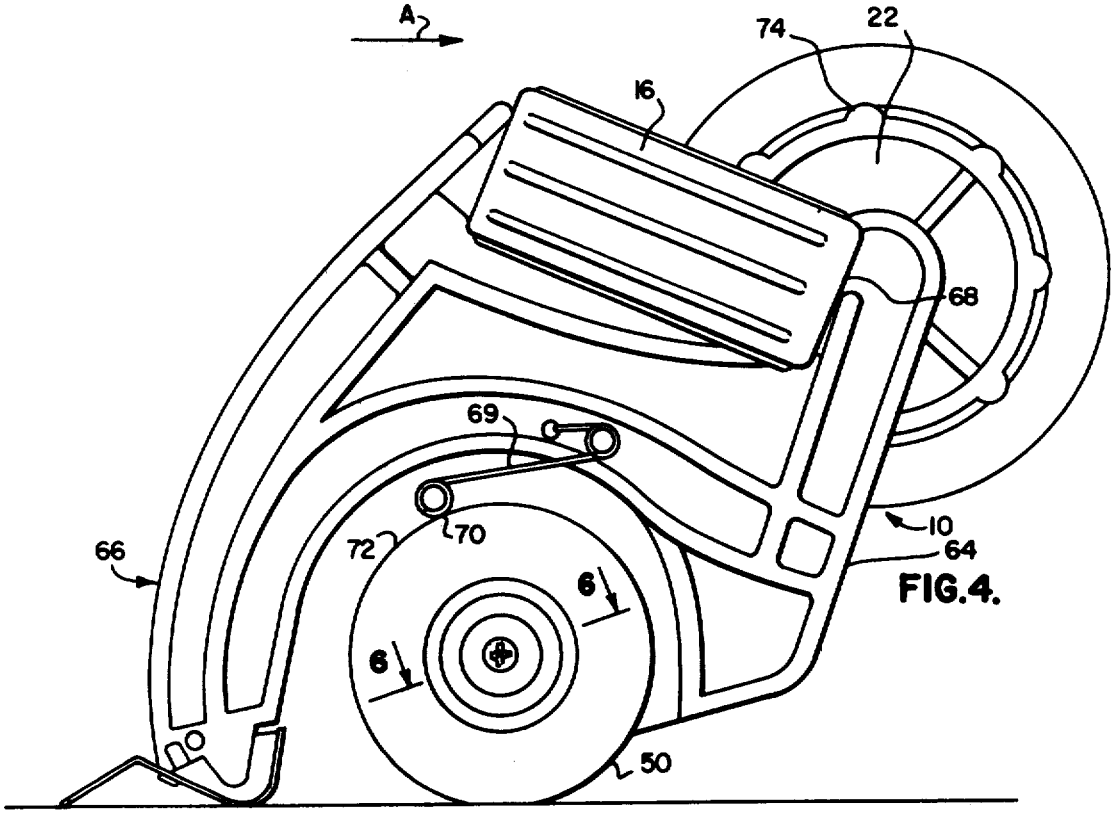
FIG. 4 is a side elevational view of the hand held masking machine of the invention taken from the line 4—4 of FIG. 3.

The paper roll holder 34, as shown in FIG. 6, is provided with an *edge or* end portion 52 adjacent the offset frame portion 38. This end portion 52 of the paper roll holder is disposed in overlapping relationship with [an] *the inner edge or* end 54 of the tape roll holder which is adjacent to the flat portion 12 of the frame 10, so that tape dispensed from the tape roll holder and from the roll 28 thereon overlaps the ends 48 of the roll of paper and the edge of the paper so as to adhesively secure the tape to the paper and to allow a portion of the adhesive side of the tape to extend beyond the edge of the paper or the end *48* of the roll 50 of paper. Thus, this adhesive portion extending beyond the end or the edge of the roll of paper is adapted to be adhesively engaged with a surface being masked such as the surface 56 shown in FIG. 1 of the drawings or the surface 58 shown in FIG. [3] *4* of the drawings. It will be seen that the roll of paper 50 is provided with an end 60 opposite to the end 48 and that the longitudinal axis *18* of the handle 16 is disposed at substantially right angles to the rotary axis 40 of the paper roll holder and thus the axis 18, being offset from the flat portion 12 of the frame, disposes the axis of the handle in a position [substantially intersecting the rotary axis] *such that a plane through the axis 18 substantially perpendicular to the axis of rotation 40* of the paper *roll* holder [40 at right angles and in a position] *34 intersects axis 40* between said opposite ends 48 and 60 of the roll of paper 50. The end portion 52 of the paper roll holder 34 may be considered to be the first end and an end portion 62 may be considered to be the second end of the paper roll holder 34. Said frame 10, as shown in FIGS. 2 and 4, is provided with a rearward portion 64 and a forward portion 66.

Said handle 16 is provided with a rearwardly extending end 68 which extends toward said rearward portion 64 of said frame so that the frame, during operation, may be pulled backwardly in the direction of the arrow A in FIG. 4 of the drawings during the application of masking tape and paper to a surface being masked as will be hereinafter described in detail.

A paper tension spring 69 is mounted on said frame 10 at one side of its flat portion 12 next to and below the handle 16. This spring is provided with a coil portion 70 which bears on a peripheral portion 72 of the roll of paper 50; thus insuring the even movement of the roll of paper and insuring that it does not become inadvertently unrolled.

Figure 7:
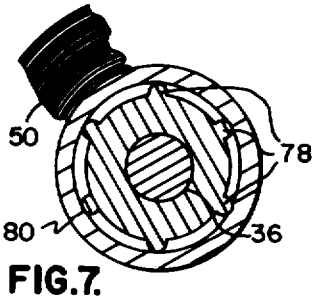
FIG. 7 is a fragmentary sectional view taken from the line 7—7 of FIG. 6.

The tape roll holder 22 is provided with arcuate ribs 74 which extend radially outward to frictionally hold a cardboard or other sleeve member 76 on which the roll of tape 28 is carried. Likewise, the paper roll holder 34 is provided with radially extending arcuate ribs 78, as shown in FIG. 7. These ribs 78 engage a cardboard cylindrical core 80 of the roll of paper 50 for frictionally retaining the roll of paper 50 on the paper roll holder 54 during operation.

Figure 8:
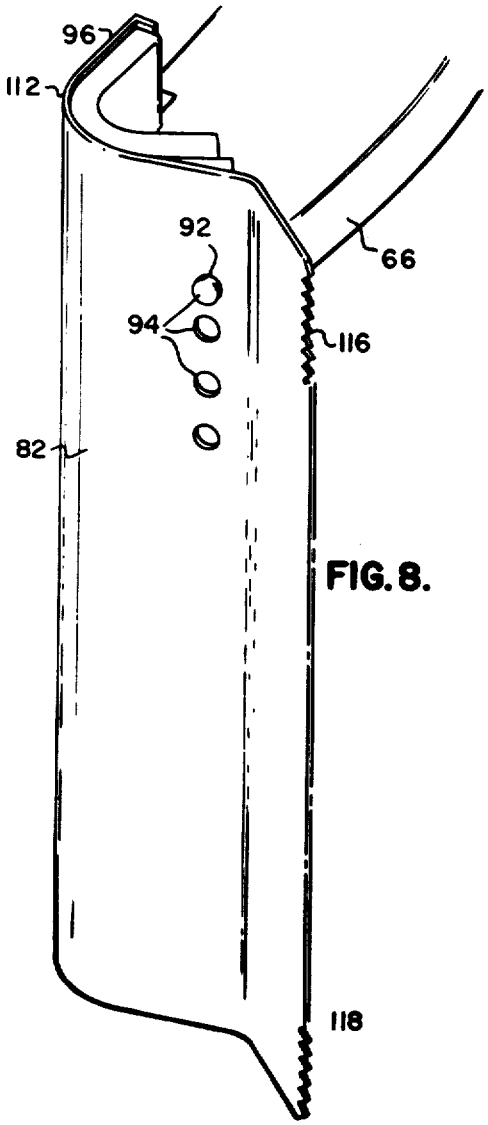
FIG. 8 is a perspective view of the paper guide bar of the machine of the invention.
Figure 9:
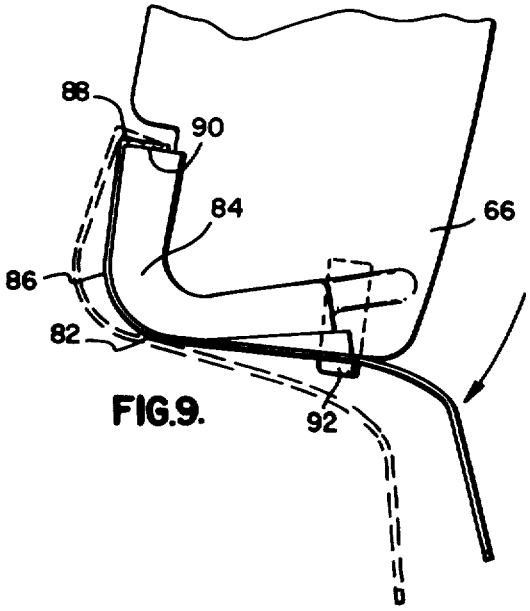
FIG. 9 is an enlarged end view of the guide bar shown in FIG. 8 and illustrating varying positions of the guide bar relative to the frame for removing and adjusting the position of the guide bar relative to said frame.

Mounted on the forward portion 66 of the frame 10 is a guide bar 82. This guide bar 82 is shown best in FIGS. 1, 8 and 9. This guide bar is elongated [and], *has a longitudinal axis, and its length is* substantially coextensive with the roll of paper from its end 48 to its end 60, as shown in FIG. 2 of the drawings. The guide bar 82 is removeably connected to the forward portion 66 of the frame 10. The frame 10 is provided with a convex arcuate [portion] *guide bar mounting means* 84 around which a conforming portion 86 of the guide bar is engaged. The guide bar is provided with an angular hook portion 88 which hooks over a ledge 90 adjacent to the arcuate portion 86 and a projecting detent portion 92 integral with the forward portion 66 of the frame projects through any one of a plurality of openings 94 in the guide bar 82. The holes are so disposed that tension of the portion 86 of the guide bar 82 is caused when one of the openings 94 is forced over the projection 92. This frictionally holds the guide bar 82 in firm engaged relationship with the arcuate portion 84 of the front portion 66 of the frame 10.

The openings 94 are spaced apart; as for example they are spaced equal to three quarters of an inch, one inch, one and a half inches and two inches, which correspond to the widths of tape which may be on the roll of tape 28. Thus, the guide bar 82 may be adjusted such that any one of the holes 94 is over the projection 92 [and holding the respective end 96 of the guide bar in appropriately spaced relationship with the end 48 of the roll of paper 50 so as to provide for the respective overlap of the adhesive tape relative to the edge of paper dispensed from the roll 50 at its end 48] *to position tape end 96 of guide bar 82 so that it is substantially aligned with the outer edge of the masking tape dispensed from the roll of masking tape 28 mounted on the tape roll holder as is best illustrated in FIG. 2.*

Figure 1:
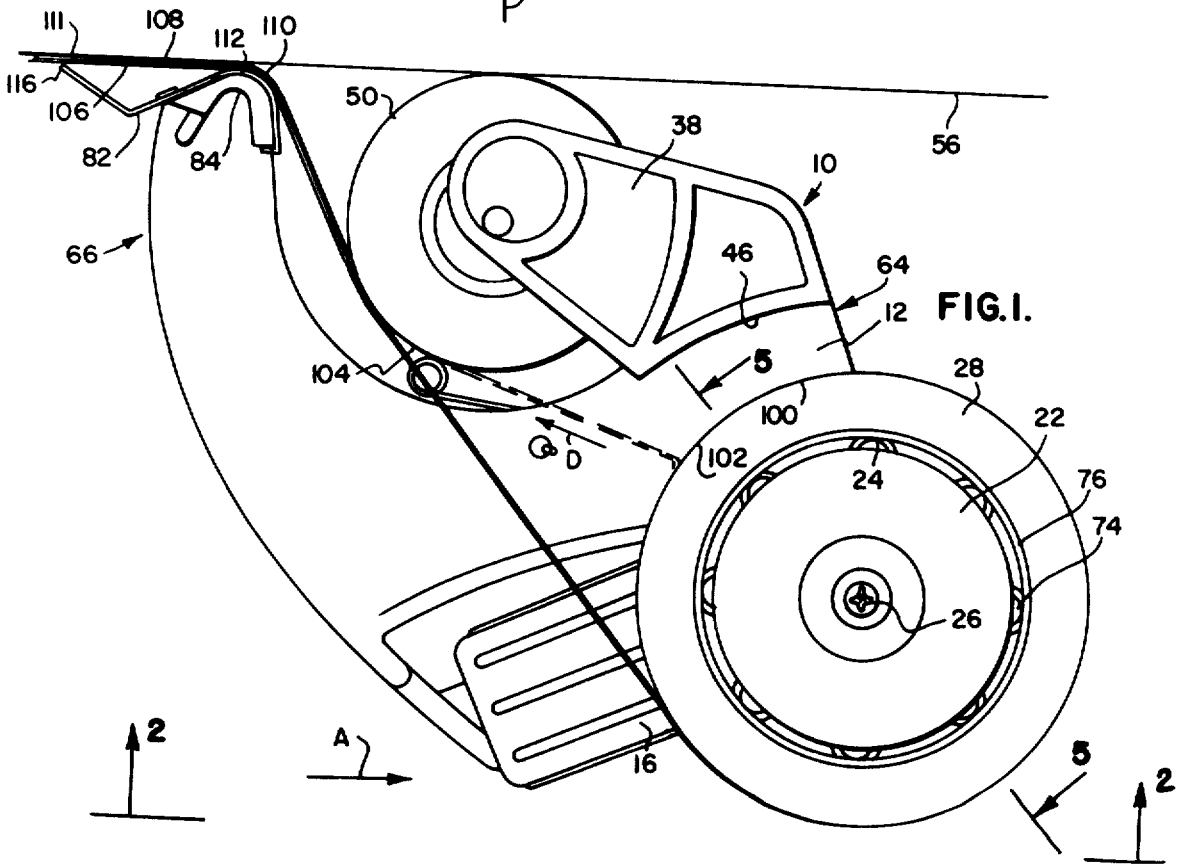
FIG. 1 is a side elevational view of the hand held masking machine of the invention.
Figure 3:
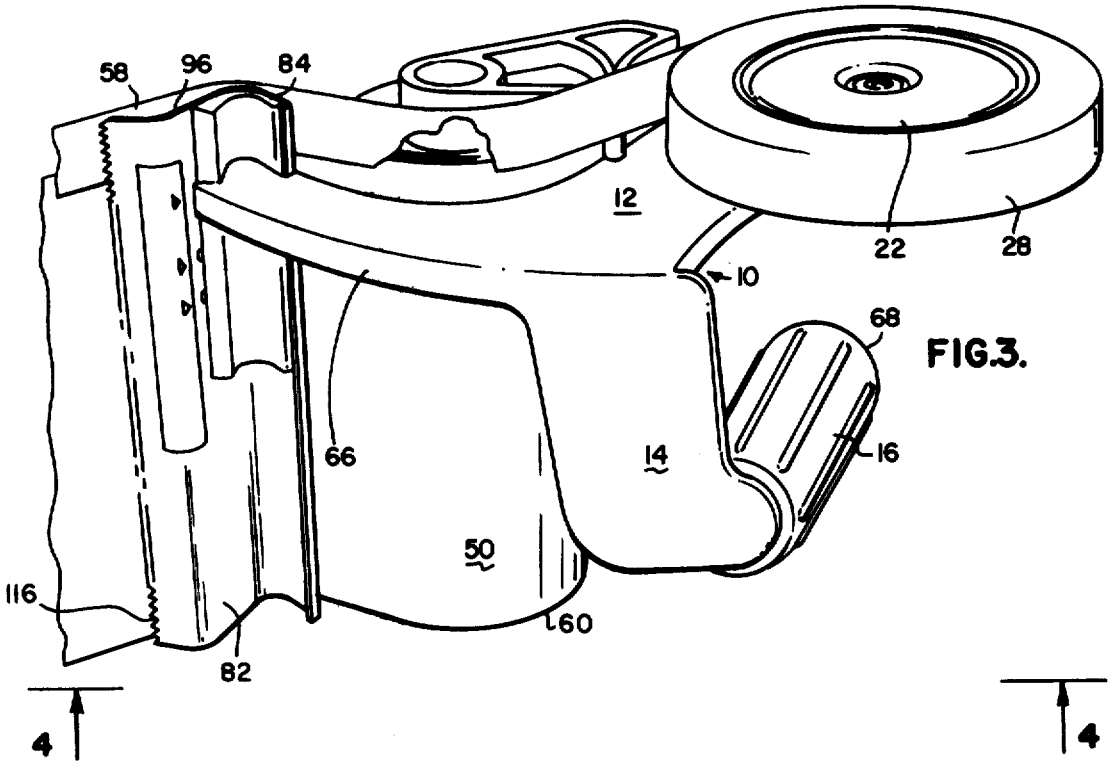
FIG. 3 is a perspective view of the hand held masking machine of the invention shown dispensing paper and tape onto a surface being masked and such that the tape is adhesively secured to the surface and provides sufficient holding force to unroll and dispense further amounts of paper and tape onto said surface.

The double ended arrow 98 in FIG. 2 of the drawings represents the amount of overlap of the adhesive portion of the tape beyond the edge of the paper or the end 48 of the roll 50, and this portion of the tape which overlaps the edge of the paper extends the distance 98 beyond the paper and is thus exposed to adhesive engagement with the surface 56 as shown in FIG. 1 of the drawings.

As the *tape* end *96* of the guide bar 82 is adjusted in the direction of an arrow C in FIG. 2 of the drawings by the use of the openings 94 and the projection 92, *to accommodate two rolls of masking tape of differing widths,* the amount of adhesive surface of the tape is extended so that an extended adhesive surface area may be attained for use in holding the paper 50 on a surface, depending upon the surface and its ability to retain the adhesive tape.

As shown in FIG. 1 of the drawings, the adhesive tape is pulled in the direction of an arrow D from the periphery 100 of the roll of tape 28. The tape adhesively resists removal from the roll at a location 102 such that the [alignment of the] tape is drawn over the periphery of the roll of paper at 104, and then the tape is adhesively secured to the paper. The tape, in the position shown in FIG. 1 at 106, is adhesively secured to a portion of the paper at 108, and the curved portion of the guide bar which is wrapped around the curved portion 84 of the frame 66 bears against the paper and tape at 110 forcing it onto the surface 56 and thus wiping it such that the adhesive side of the tape at 111 is adhesively secured to the surface 56.

In operation, the paper and tape is extended to the position shown in FIG. 1 of the drawings under the arcuate surface 112 of the guide bar, and the tape is adhesively secured to the surface 56. Subsequently, the frame is moved by manual force on the handle 16 in the direction of the arrow A, shown in FIG. 4 of the drawings and also shown in FIG. 1 of the drawings. Whereby, tension on the tape and the paper dispenses the tape and paper from the rolls of tape and paper carried by the machine and, when the area desired to be masked has been reached, a cutting edge 116 of the guide bar 82 is utilized to cut off the tape and the paper. This cutting edge is composed of a series of spaced saw tooth like portions 118 which very efficiently cut and tear the paper and tape with a simple tilting motion of the handle 16 so as to force the cutting edge 116 into engagement with the paper and the tape.

It will be obvious to those skilled in the art that various modifications may be resorted to without departing from the spirit of the invention.

I claim:

[1. In a hand held masking machine: a frame; a rotary tape roll holder rotatably mounted on said frame; an elongated rotary paper roll holder rotatably mounted on said frame; said paper roll holder having a rotary axis and first and second ends; an elongated paper guide bar mounted on said frame in substantially parallel spaced relation to said rotary axis of said paper roll holder; said tape roll holder having a rotary axis generally parallel to said rotary axis of said paper roll holder; said tape roll holder having an end portion; said first end of said paper roll holder disposed in spaced overlapping relation to said end portion of said tape roll holder; whereby an edge of tape dispensed from said tape roll holder is spaced from and overlaps an edge of said paper disposed substantially in alignment with said first end portion of said paper roll holder; said frame having first and second offset portions adjacent to which said end portion of said tape roll holder and said first end of said paper roll holder respectively are disposed; a manually holdable handle on said frame; said handle spaced from said first offset portion of said frame in a direction toward which said end portion of said tape roll holder is directed; whereby said tape roll holder may be operated in close proximity to a building room corner or the like with said handle disposed substantially spaced therefrom; said paper roll holder extending from said second offset portion of said frame in said direction.]

[2. The invention as defined in claim 1, wherein: a roll of paper having opposite ends is disposed on said paper roll holder; and said handle is disposed in a position generally between opposite ends of a roll of paper disposed on said paper roll holder; said roll of paper having a peripheral portion.]

[3. The invention as defined in claim 2, wherein: a roll of tape is disposed on said tape roll holder; said roll of tape having a peripheral portion; said tape extending from said peripheral portion and having an adhesive side disposed in a direction facing inwardly toward said rotary axis of said tape roll holder whereby, when said tape is pulled and adhesively separated from said peripheral portion, adhesive tension tends to force said adhesive side of said tape toward said peripheral portion of said roll of paper as said tape is pulled therefrom, thus making adhesive contact with said peripheral portion of said roll of paper as the paper is dispensed therefrom.]

[4. The invention as defined in claim 3, wherein: said tape and paper are adhesively secured together with said tape overlapping said paper and whereby said tape may be adhesively secured to a surface being masked with said paper whereupon tension applied to said tape by movement of said frame unrolls and dispenses the tape and paper onto said surface; said guide bar being disposed to be pressed and wiped against said tape and paper to insure adhesion of said tape to said surface as said frame is moved thereover.]

[5. The invention as defined in claim 4, wherein: a resiliently loaded friction means is carried by said frame and disposed to frictionally and resiliently bear upon said peripheral portion of said roll of paper to insure even dispensation thereof relative to dispensation of said tape.]

[6. The invention as defined in claim 1, wherein: said paper roll holder is disposed between said tape roll holder and said guide bar; said guide bar having an elongated convex surface disposed to engage paper and tape adhesively secured thereto so as to force said adhesive side of said tape into contact with a surface being masked.]

[7. The invention as defined in claim 6, wherein: said guide bar is removeably coupled to said frame and longitudinally adjustable in a direction parallel with said rotary axes so as to accommodate tape of varying widths which may extend varying distances from an edge of said paper to which said tape is adhesively secured and overlapped relative thereto.]

[8. The invention as defined in claim 6, wherein: said guide bar is provided with a cut off edge disposed to cut off paper and tape when a masking operation is completed.]

[9. The invention as defined in claim 8, wherein: said cut off edge being a row of spaced sharp pointed cutter portions.]

[10. The invention as defined in claim 1, wherein: said masking machine is provided with a forward portion and a rearward portion; said manually holdable handle being elongated and having an end portion extending toward said rearward portion of said masking machine.]

[11. The invention as defined in claim 10, wherein: said paper roll holder is in a position which is disposed forwardly toward said forward portion of said masking machine relative to said handle.]

[12. The invention as defined in claim 11, wherein: said guide bar is provided with opposite ends and disposed at said forward portion of said machine; and said handle having a longitudinal axis which is disposed generally at an angle to said guide bar; and said longitudinal axis being disposed between said opposite ends of said guide bar.]

*13. A hand held masking machine comprising:*

*a substantially flat frame having an outer and an inner side, and front, central and rear portions;*

*an offset to the flat frame member connected to the central portion and displaced in the direction of the outer side of the frame;*

*a tape roll holder mounted on the outer side of the rear portion of the frame for rotation about a first axis of rotation, said tape roll holder adapted to have a roll of masking tape mounted on the tape roll holder, each roll of masking tape adapted to be mounted on the tape roll holder having a width and an outer edge, the width of each such roll of masking tape not necessarily being the same so that the distance of the outer edge of the tape from the outer side of the frame is a function of the width of the tape;*

*a paper roll holder mounted on the offset for rotation about a second axis of rotation, said first and second axes of rotation being substantially parallel but displaced from one another, said paper roll holder adapted to have a roll of paper mounted thereon for rotation about the second axis of rotation, said paper roll holder being mounted on the offset so that the majority of the width of a roll of paper mounted thereon is positioned beyond the inner side of the frame, said paper roll being positioned so that the tape dispensed from a roll of tape mounted on the tape roll holder overlaps an edge of the paper dispensed from a roll of paper mounted on the paper roll holder;*

*a handle bracket mounted on the central portion of the frame and extending in a direction substantially parallel to the second axis of rotation and away from the inner side of the frame;*

*a handle secured to the handle bracket, said handle being positioned so that the hand of the user of the masking machine gripping the handle is spaced from the inner side of the frame;*

*guide bar mounting means formed at the front portion of the frame; and*

*a guide bar having a tape end adjustably mounted on the guide bar mounting means so that the tape end of the guide bar can be positioned to substantially be aligned with the outer edge of the tape positioned on the tape roll holder.*

*14. The hand held masking machine of claim 13 in which the first and second axes of rotation are spaced apart such that the peripheries of a roll of tape mounted on the tape roll holder and of a roll of paper mounted on the paper roll holder are not in contact.*

*15. The hand held masking machine of claim 14 in which the guide bar has a longitudinal axis which is substantially parallel to the first and second axes of rotation of said holders.*

*16. The hand held masking machine of claim 15 in which a resiliently loaded friction means is mounted on the frame and is adapted to resiliently bear upon a roll of paper mounted on the paper roll holder to frictionally resist rotation of a roll of paper mounted thereon.*

*17. The hand held masking machine of claim 16 in which the guide bar has an elongated convex surface adapted to engage paper and tape dispensed by said machine which are adhesively secured together and to force the exposed adhesive side of the tape into contact with a surface to be masked.*

*18. The hand held masking machine of claim 17 in which the guide bar is provided with a cut-off edge adapted to cut-off paper and tape dispensed by the masking machine.*

*19. The hand held masking machine of claim 18 in which the cut-off edge is a row of spaced sharp pointed teeth.*

* * * * *